US010135580B2

(12) United States Patent
Cho et al.

(10) Patent No.: US 10,135,580 B2
(45) Date of Patent: Nov. 20, 2018

(54) APPARATUS AND METHOD FOR RETRANSMISSION IN A WIRELESS COMMUNICATION SYSTEM (75) Inventors: Min-Hee Cho, Suwon-si (KR);
Jae-Woo So, Bucheon-si (KR);
Jae-Hee Cho, Seoul (KR);
Hyun-Kyung Kim, Suwon-si (KR);
Kwan-Hee Roh, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 1162 days.

(21) Appl. No.: 12/139,934

(22) Filed: Jun. 16, 2008

(65) Prior Publication Data
US 2008/0310361 A1  Dec. 18, 2008

(30) Foreign Application Priority Data
Jun. 14, 2007 (KR) .................. 10-2007-0058183

(51) Int. Cl.
*H04L 1/18* (2006.01)
*H04L 5/00* (2006.01)
*H04W 72/04* (2009.01)

(52) U.S. Cl.
CPC .......... *H04L 1/1854* (2013.01); *H04L 1/1861* (2013.01); *H04L 5/0007* (2013.01); *H04L 5/0078* (2013.01); *H04L 5/0094* (2013.01); *H04W 72/042* (2013.01)

(58) Field of Classification Search
None
See application file for complete search history.

(56) References Cited

U.S. PATENT DOCUMENTS

| | | | |
|---|---|---|---|
| 2005/0288028 A1* | 12/2005 | Lim | H04W 36/18 455/442 |
| 2007/0133458 A1* | 6/2007 | Chandra et al. | 370/329 |
| 2007/0153735 A1* | 7/2007 | Frederiksen | H04L 1/1812 370/329 |
| 2007/0206531 A1* | 9/2007 | Pajukoski | H04W 74/0866 370/329 |
| 2008/0062944 A1* | 3/2008 | Smith | H04L 1/1812 370/342 |
| 2008/0080465 A1* | 4/2008 | Pajukoski et al. | 370/342 |
| 2008/0187136 A1* | 8/2008 | Zhang | H04L 1/1671 380/270 |
| 2008/0192674 A1* | 8/2008 | Wang et al. | 370/315 |
| 2009/0285163 A1* | 11/2009 | Zhang et al. | 370/329 |

(Continued)

FOREIGN PATENT DOCUMENTS

KR  1020050009663  1/2005
KR  1020060072487  6/2006

(Continued)

*Primary Examiner* — Gregory B Sefcheck
*Assistant Examiner* — Amar Persaud
(74) *Attorney, Agent, or Firm* — The Farrell Law Firm, P.C.

(57) ABSTRACT

An apparatus and method for retransmission in a wireless communication system. The method includes transmitting data to a Mobile Station (MS), identifying if there is an error in the transmitted data through a control message, if there occurs an error in the data, allocating resources for retransmitting data for erroneous data, transmitting information on the resources allocated for retransmission, to the MS, and retransmitting the data for the erroneous data to the MS.

18 Claims, 8 Drawing Sheets (56) References Cited

U.S. PATENT DOCUMENTS

| | | | |
|---|---|---|---|
| 2009/0327828 A1* | 12/2009 | Ojala | H04L 1/1887 |
| | | | 714/749 |
| 2010/0002638 A1* | 1/2010 | Park et al. | 370/329 |
| 2010/0115369 A1* | 5/2010 | Ihm | H04L 1/1614 |
| | | | 714/749 |
| 2010/0202369 A1* | 8/2010 | Pedersen et al. | 370/329 |
| 2010/0202433 A1* | 8/2010 | Ihm et al. | 370/343 |
| 2010/0248765 A1* | 9/2010 | Chun | H04W 72/042 |
| | | | 455/509 |

FOREIGN PATENT DOCUMENTS

| | | | |
|---|---|---|---|
| KR | 1020060078667 | 7/2006 | |
| KR | 100668666 | 1/2007 | |
| WO | WO-2007119542 A1 * | 10/2007 | H04L 5/0094 |

* cited by examiner

APPARATUS AND METHOD FOR RETRANSMISSION IN A WIRELESS COMMUNICATION SYSTEM

PRIORITY

This application claims priority under 35 U.S.C. § 119(a) to a Korean Patent Application filed in the Korean Intellectual Property Office on Jun. 14, 2007, and assigned Serial No. 2007-58183, the contents of which are herein incorporated by reference.

BACKGROUND OF THE INVENTION

1. Field of the Invention

The present invention relates generally to an apparatus and method for retransmission in a wireless communication system, and in particular, to a retransmission apparatus and method for Mobile Stations (MSs) with fixedly allocated radio resources in the wireless communication system.

2. Description of the Related Art

In a wireless communication system, a Base Station (BS) allocates resources to Mobile Stations (MSs) for providing a service and then transmits resource allocation information to the MSs using a resource allocation message.

The wireless communication system communicates using limited time-frequency resources. Thus, the resource allocation message acts as an overhead in the wireless communication system. For example, when supporting a service that periodically generates traffic, such as a Voice of IP (VoIP) service, a BS periodically sends a resource allocation message including resource allocation information to MSs. If the BS periodically allocates the same resource to the MSs, the BS periodically sends the same resource allocation message to the MSs. Consequently, resources are unnecessarily wasted because the BS is periodically sending the same resource allocation message.

In order to solve this problem, a BS may allocate fixed radio resources to an MS performing a type of service that periodically generates traffic. Thereafter, the MS periodically performs communicates using radio resources initially fixedly allocated by the BS. Consequently, the BS reduces overhead for a resource allocation message because the BS is only sending the resource allocation message to the MS when initially allocating the fixed radio resources.

A wireless communication system also uses Automatic Retransmission reQuest (ARQ) to enhance the reliability of data transmission and increase a throughput.

For example, in a downlink, an MS identifies errors by decoding a received packet. If there is no error in the received packet, the MS sends an acknowledgement (ACK) message to a BS. If there is an error in the received packet, the MS sends a negative acknowledgement (NACK) message to the BS.

Upon receiving the ACK message from the MS, the BS transmits a new original packet. Upon receiving the NACK message, the BS retransmits a packet in response to the NACK message. Here, the BS distinguishes whether a transmitted packet is an original packet or a retransmission packet using a distinction factor included in a resource allocation message. The distinction factor includes an ARQ channel IDentification (ID), an ARQ ID sequence number, etc. That is, the MS identifies the kind of the received packet through the resource allocation message received from the BS.

When radio resources are fixedly allocated as described above, the BS of the wireless communication system does not send a resource allocation message except when initially allocating radio resources or changing fixedly allocated resources. Therefore, there is a problem that the MS cannot distinguish the kind of packet received from the BS, if the wireless communication system applies ARQ. Also, there is a problem that the MS cannot identify which original packet the retransmission packet is for, even though the MS may be able to identify a retransmission packet.

SUMMARY OF THE INVENTION

Therefore, the present invention has been designed to substantially solve at least the above problems and/or disadvantages and to provide at least the advantages below. Accordingly, one aspect of the present invention is to provide an apparatus and method for performing retransmission for a Mobile Station (MS) with fixedly allocated radio resources in a wireless communication system.

Another aspect of the present invention is to provide an apparatus and method for distinguishing a retransmission packet in an MS with fixedly allocated radio resources in a wireless communication system.

Another aspect of the present invention is to provide an apparatus and method for reducing a capacity of a control message for distinguishing a retransmission packet if radio resources are fixedly allocated to an MS in a wireless communication system.

Another aspect of the present invention is to provide an apparatus and method for reducing a capacity of a control message using an identification representing fixed allocation if radio resources are fixedly allocated to an MS in a wireless communication system.

The above and other aspects are achieved by providing an apparatus and method for retransmission in a wireless communication system.

In accordance with an aspect of the present invention, a method for downlink retransmission in a Base Station (BS) of a wireless communication system is provided. The method includes, if fixedly allocating resources to a Mobile Station (MS), transmitting data to the MS using the fixedly allocated resources, and identifying if there is an error in the transmitted data through a control message received from the MS. If there is an error in the data, allocating resources for retransmitting original data for the erroneous data, transmitting information on the resources allocated for retransmission, to the MS, and retransmitting the original data for the erroneous data to the MS using the resources allocated for retransmission.

In accordance with another aspect of the present invention, a method for downlink retransmission in a Mobile Station (MS) of a wireless communication system is provided. The method includes identifying if there is an error in data provided from a Base Station (BS) through resources fixedly allocated by the BS, and transmitting information on if there is an error in the data to the BS. If there is an error in the data, identifying resource allocation information for receiving retransmission data for the erroneous data in a signal provided from the BS, and receiving the retransmission data for the erroneous data through the resource allocation information.

In accordance with another aspect of the present invention, a method for uplink retransmission in a Base Station (BS) of a wireless communication system is provided. The method includes, if fixedly allocating resources to a Mobile Station (MS), identifying if there is an error in data provided from the MS using the fixedly allocated resources, if there is an error in the data, allocating resources for receiving retransmission data for the erroneous data, transmitting information on the resources allocated to receive the retransmission data, to the MS, and receiving the retransmission data for the erroneous data from the MS using the resource allocation information.

In accordance with another aspect of the present invention, a method for uplink retransmission in a Mobile Station (MS) of a wireless communication system is provided. The method includes transmitting data to a Base Station (BS) using resources fixedly allocated by the BS, identifying if there is an error in the transmitted data through a control message received from the BS, if there is an error in the data, identifying resource information for data retransmission in a signal provided from the BS, and retransmitting original data for the erroneous data to the BS through the resource information.

In accordance with another aspect of the present invention, a Base Station (BS) apparatus of a wireless communication system is provided. The BS apparatus includes a resource allocation unit for, if a Mobile Station (MS) uses a service that periodically generates traffic, fixedly allocating resources to the MS and, if there is an error in transmitted/received data, allocating resources for retransmitting data for the erroneous data, and a transmitter for transmitting information on the fixedly allocated resources and information on the resources allocated for retransmission, to the MS.

In accordance with another aspect of the present invention, a Mobile Station (MS) apparatus of a wireless communication system is provided. The MS apparatus includes a message processor for identifying information on resources fixedly allocated by a Base Station (BS) and information on resources allocated for retransmission, a receiver for receiving data from the BS through the fixedly allocated resources and receiving retransmission data from the BS through the resources allocated for retransmission, and a transmitter for transmitting data to the BS through the fixedly allocated resources and retransmitting data to the BS through the resources allocated for retransmission.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail because they would obscure the invention in unnecessary detail.

A retransmission technology for a Mobile Station (MS) with fixedly allocated radio resources in a wireless communication system according to the present invention is described below. The retransmission technology represents an Automatic Retransmission reQuest (ARQ) technique.

The following description is made on the basis of an Orthogonal Frequency Division Multiplex Access (OFDMA) wireless communication system, for example. The same is also applicable to other multiplexing access communication systems.

Figure 1:
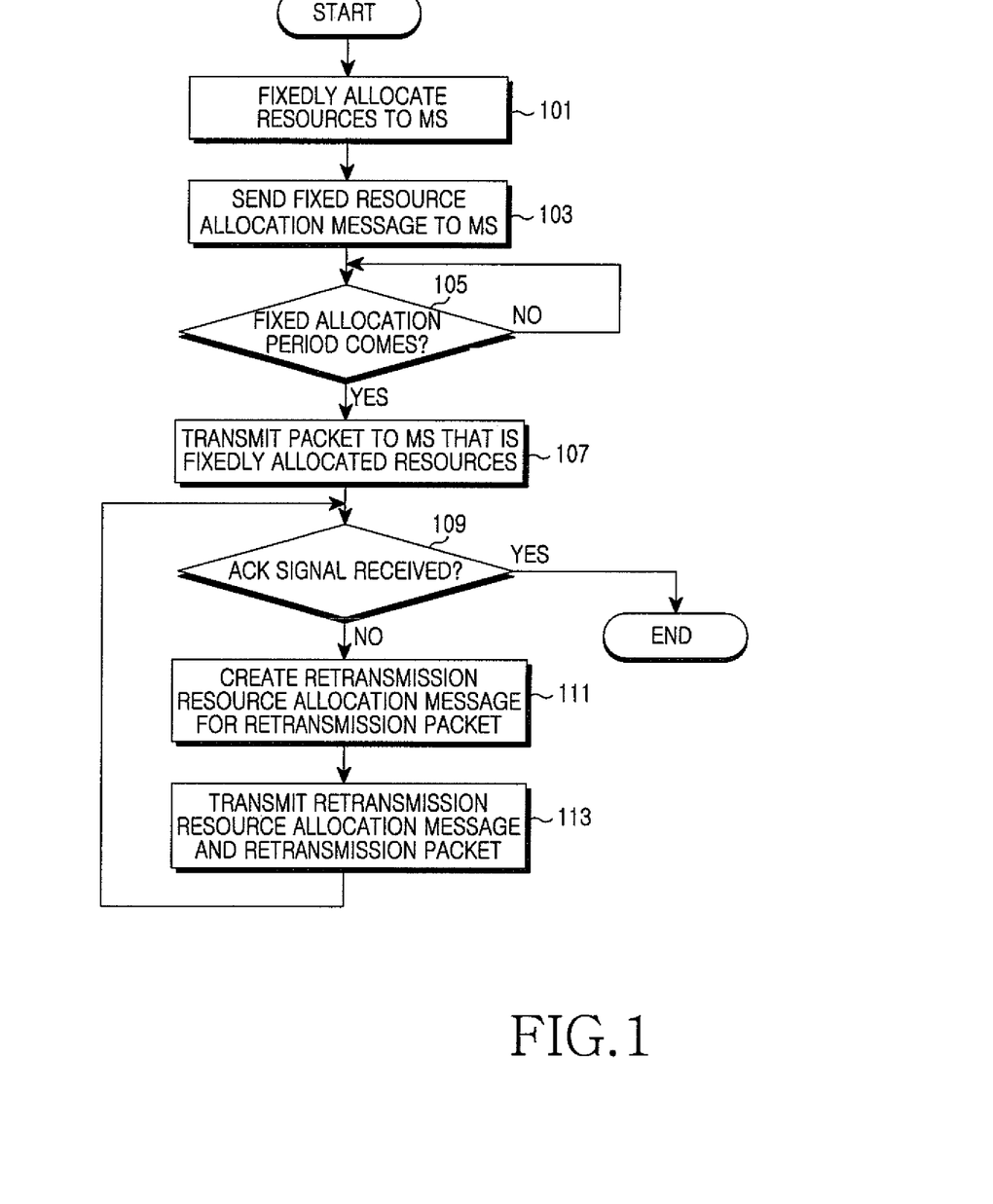
FIG. 1 is a flow diagram illustrating a process of retransmitting a DownLink (DL) packet in a Base Station (BS) of a wireless communication system according to an embodiment of the present invention.

FIG. 1 is a flow diagram illustrating a process of retransmitting a DownLink (DL) packet in a BS of a wireless communication system according to an embodiment of the present invention. Referring to FIG. 1, in step 101, the BS fixedly allocates radio resources to MSs that use a service that periodically generates traffic among MSs providing a service, e.g., a Voice of Internet Protocol (VoIP).

After allocating the radio resources, the BS transmits fixed resource allocation information to the MSs in step 103. When the BS initially fixedly allocates radio resources to the MS, the BS constructs a fixed resource allocation message as in Table 1 below, for example, and sends the fixed resource allocation message to the MS. Also, when the BS changes the resources fixedly allocated to the MS or releases the fixedly allocated resources, the BS constructs and sends the fixed resource allocation message.

TABLE 1

| Fields | Description |
|---|---|
| xx_DL_IE( ){ | |
| Connection ID | Identification of service connection intending for allocation in fixed allocation mode. Generally, Transport Connection ID (TCID) (16 bits) |
| Circuit ID | Identification used only in fixed allocation mode in place of CID. |
| slotOffset | Allocation start slot number of fixed-allocation-mode packet |
| noSlot | Number of allocation slots of fixed-allocation-mode packet |
| Period | Allocation period |
| DIUC, Repetition | Modulation and coding scheme |
| HARQ Enable | 0b0: apply no HARQ |
| | 0b1: apply HARQ |
| If(HARQ Enable = = 0b1){ | |
| UL ACKCH Index | Index for channel for sending ACK for downlink HARQ packet |
| } | |
| } | |

In Table 1, the fixed resource allocation message includes a Connection IDentification (CID) field representing a proper CID of an MS to receive the fixed resource allocation message, a circuit ID field that is a proper CID of the MS for representing fixed resource allocation in place of the CID field, a slotoffset field including start slot information on a packet in the case of transmitting the packet through fixedly allocated resources, a noSlot field representing a size of resources fixedly allocated to transmit the packet, a period field representing a fixed allocation period of the resources, a Downlink Interval Usage Code (DIUC) and repetition field representing a modulation and coding scheme for improvement of a reception ratio for the resource allocation message, a Hybrid Automatic Retransmission reQuest (HARQ) enable field representing HARQ enabling or disabling, an ACK channel index field including information on a channel to transmit an acknowledgement (ACK)/negative acknowledgement (NACK) signal for a DL packet, etc. The circuit ID has a smaller size than the CID. The size of the circuit ID is defined depending on number of MSs that can be fixedly allocated resources by the BS.

After transmitting the fixed resource allocation information to the MSs in step 103, in step 105, the BS identifies if a period of the resources fixedly allocated to the MSs comes. If the fixed allocation period comes, the BS transmits a packet to the MSs fixedly allocated the resources in step 107. The BS does not send a separate resource allocation message for the packet to the MS because both the BS and the MSs recognize the fixedly allocated resources for transmitting the packet. If the fixed allocation period does not come in the step 105, the BS repeatedly performs the step 105.

In step 109, the BS identifies if it receives a signal representing if there is an error in the packet transmitted in the step 107. The signal representing if there is an error is generally an ACK signal or a NACK signal.

If the NACK signal is received in step 109, the BS recognizes that there is an error in the packet transmitted to the MS in step 111. Thus, the BS creates a retransmission resource allocation message as shown in Table 2, for example, for retransmitting a packet in response to the NACK signal.

TABLE 2

| Fields | Description |
| --- | --- |
| xx_IE( ){ | |
|   Circuit ID | Connection identification for reception of reTx HARQ packet (8 bits) |
|   frameNumber | 4 LSB of frameNumber where newTx HARQ packet has been transmitted |
|   slotOffset | Allocation start slot number of reTx HARQ packet |
|   noSlot | Allocation slot number of reTx HARQ packet |
|   ... | ... |
| } | |

In Table 2, the retransmission resource allocation message includes a circuit ID field representing a CID of an MS to receive a retransmission resource allocation message among MSs using fixedly allocated resources, a frameNumber field representing information on a frame for which an original packet for the retransmission packet has been transmitted, a slotoffset field including start slot information allocated to transmit the retransmission packet, a noSlot field representing a size of the retransmission packet, etc. For example, the frameNumber field includes four Least Significant Bits (LSBs) of a frame for which the original packet for the retransmission packet is transmitted.

After creating the retransmission resource allocation message in step 111, the BS transmits the retransmission packet responsive to the NACK signal and the retransmission resource allocation message for the retransmission packet to the MS in step 113. The retransmission resource allocation message includes retransmission resource allocation information on the retransmission packet.

Thereafter, the BS returns to step 109, identifying if it receives a signal representing if there is an error in the retransmission packet.

If the ACK signal is received in the step 109, the BS recognizes that there is no error in the packet transmitted to the MS or the retransmission packet and then, terminates the process of the present invention.

As described above, when fixedly allocating radio resources to an MS, a BS transmits an original packet to the MS using the fixedly allocated radio resources without sending a resource allocation message. However, when retransmitting a packet, the BS retransmits the packet without using the fixedly allocated radio resources, i.e., using separate radio resources. Therefore, in order to retransmit a packet, the BS creates a retransmission resource allocation message for the retransmission packet and sends the retransmission resource allocation message to the MS.

Figure 2:
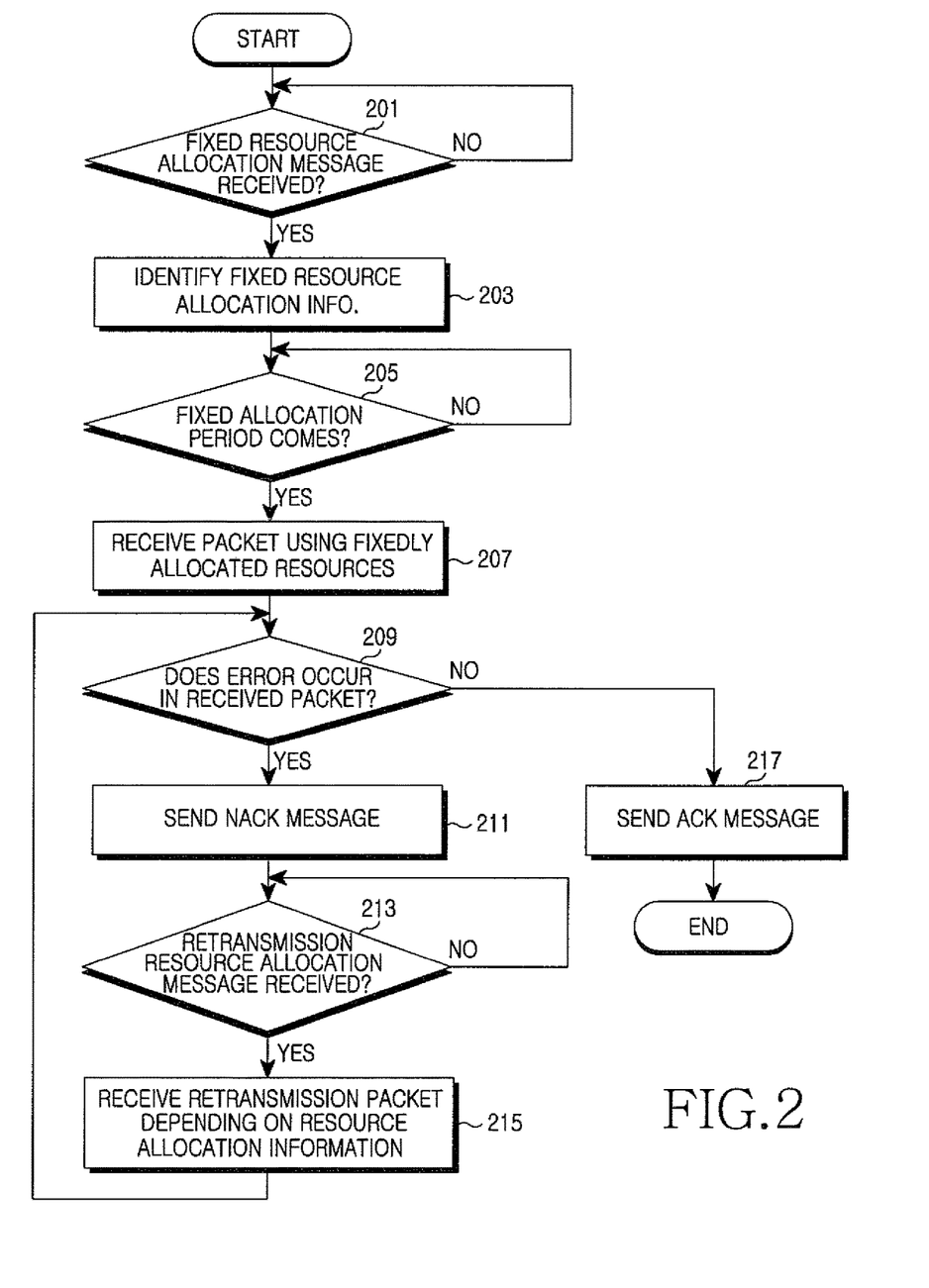
FIG. 2 is a flow diagram illustrating a process of receiving a retransmission DL packet in a Mobile Station (MS) of a wireless communication system according to an embodiment of the present invention.

If an MS providing a service is fixedly allocated radio resources in the wireless communication system, the MS communicates using the fixedly allocated radio resources as illustrated in FIG. 2.

FIG. 2 is a flow diagram illustrating a process of receiving a retransmission DL packet in an MS of a wireless communication system according to an embodiment of the present invention. The description is made on the assumption that the MS uses a service periodically generating traffic, such as a VoIP service.

Referring to FIG. 2, in step 201, the MS identifies if it receives a fixed resource allocation message from a BS. If the fixed resource allocation message is not received, the MS repeatedly performs the step 201.

If the fixed resource allocation message is received, the MS identifies information on radio resources, which are fixedly allocated by the BS, in the fixed resource allocation message in step 203. The fixed resource allocation message can be constructed as in Table 1 above and includes the fixed resource allocation information such as a position of the resources fixedly allocated to the MS, a size of the fixedly allocated resources, and a fixed allocation period.

The MS communicates using the fixedly allocated radio resources until it receives a radio resource change message or a radio resource release message from the BS.

In step 205, the MS identifies if the fixed allocation period identified in the fixed resource allocation message arrives. If the fixed allocation period does not arrive, the MS repeatedly performs step 205.

If the fixed allocation period arrives, in step 207, the MS receives a packet transmitted by the BS, using the fixed resource allocation information.

After the packet is received, the MS identifies if there is an error in the packet in step 209. For example, the MS determines if there is an error in the packet by identifying a Cyclic Redundancy Check (CRC) of the packet.

If there is an error in the packet, the MS transmits error occurrence information on the erroneous packet to the BS in step 211. For example, the MS transmits a NACK signal for the erroneous packet to the BS.

After transmitting the NACK signal, the MS identifies if it receives a retransmission resource allocation message from the BS in step 213. If the retransmission resource allocation message is not received, the MS repeatedly performs step 213.

If the retransmission resource allocation message is received, in step 215, the MS identifies retransmission resource allocation information on a retransmission packet in the retransmission resource allocation message. Thereafter, the MS receives the retransmission packet depending on the retransmission resource allocation information. The retransmission resource allocation message includes the retransmission resource allocation information on the retransmission packet and also original packet information on the retransmission packet. Accordingly, the MS can acquire original packet information on the retransmission packet received through the retransmission resource allocation message.

If the retransmission packet is received, the MS returns to the step 209, identifying if there is an error in the retransmission packet.

If there is no error in the packet received from the BS or the retransmission packet in the step 209, the MS notifies the BS that the packet is successfully received without error in step 217. For example, the BS transmits an ACK signal for the successfully received packet to the BS.

Figure 3:
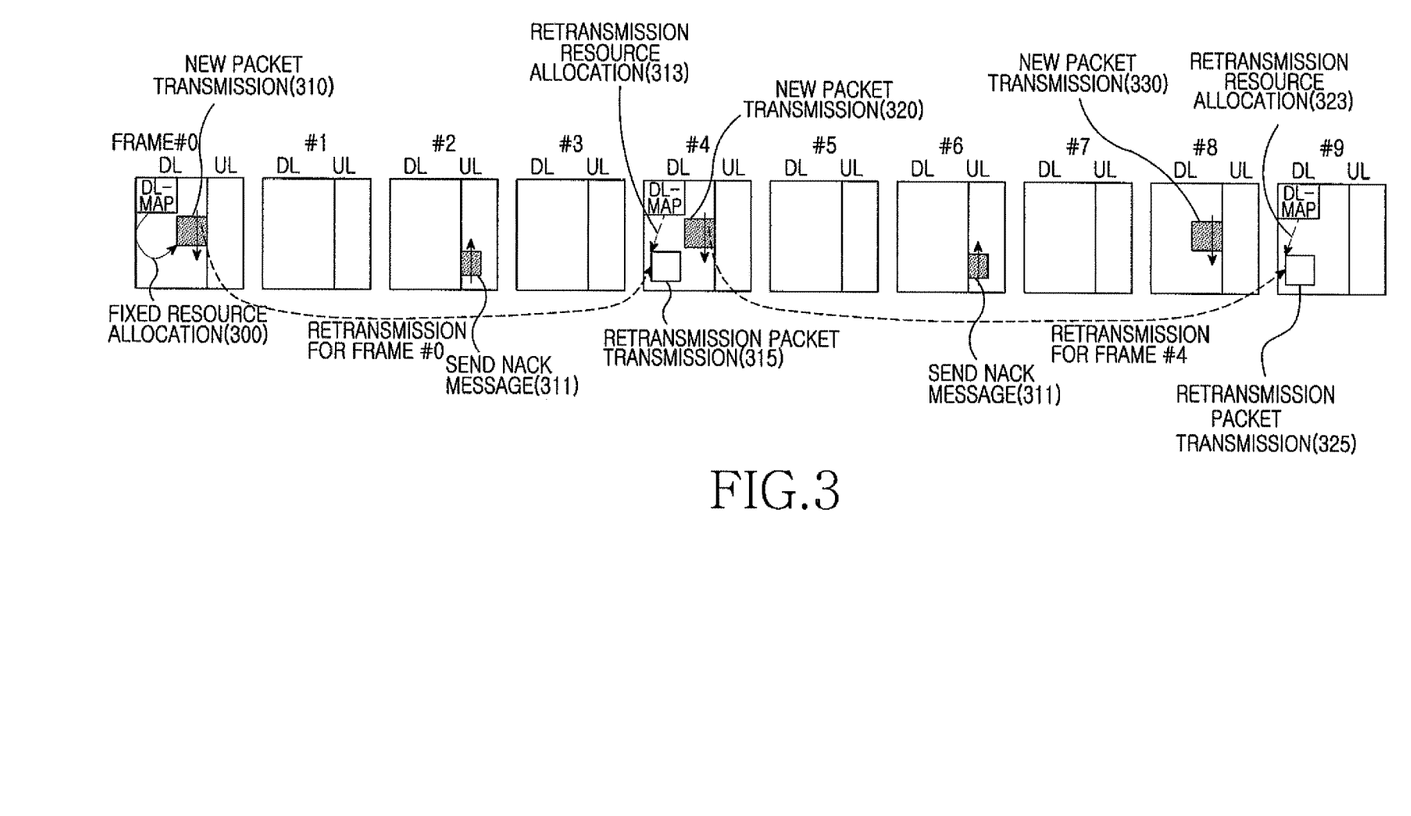
FIG. 3 is a diagram illustrating a frame for retransmitting a DL packet in a wireless communication system according to an embodiment of the present invention.

FIG. 3 is a diagram illustrating a frame for retransmitting a DL packet in a wireless communication system according to an embodiment of the present invention. The following description is based on the assumption that an MS transmits an ACK/NACK signal for a packet received from a BS, every two frames after the reception of the packet.

As illustrated in FIG. 3, if a BS fixedly allocates radio resources having a period of four frames, the BS transmits fixed resource allocation information to the MS during a $0^{th}$ frame (step 300).

The BS transmits new packets to the MS during the $0^{th}$ frame, a $4^{th}$ frame, and an $8^{th}$ frame depending on the fixedly allocated resources (steps 310, 320, and 330). At this time, the BS does not send resource allocation messages for the transmitted packets during frames other than the $0^{th}$ frame for which the radio resources are initially allocated to the MS.

The MS identifies if there is an error in the packet received from the BS during the $0^{th}$ frame. For example, the MS determines if there is an error in the packet by identifying a CRC of the packet.

During a $2^{nd}$ frame, the MS notifies the BS as to if there is an error in the packet received during the $0^{th}$ frame (step 311). For example, the MS transmits a NACK signal to the BS if there is an error in the packet. If there is no error in the packet, the MS transmits an ACK signal to the BS. An operation of the MS receiving packets during the $4^{th}$ frame and the $8^{th}$ frame is the same as an operation of the MS receiving the packet during the $0^{th}$ frame and therefore, its description is omitted below.

If the NACK signal is received from the MS during the $2^{nd}$ frame, the BS retransmits a packet to the MS in response to the NACK signal. For example, if the NACK signal is received, the BS allocates radio resources for retransmitting a packet in response to the NACK signal. Then, the BS creates a retransmission resource allocation message including retransmission resource allocation information for retransmitting the packet and sends the retransmission resource allocation message to the MS (step 313). The BS transmits a retransmission packet to the MS through the radio resources that are allocated to the MS through the retransmission resource allocation message (step 315).

As described above, when retransmitting a packet, the BS allocates radio resources for retransmitting the packet and sends a retransmission resource allocation message including retransmission resource allocation information to the MS. Accordingly, the BS can retransmit the packet differently from information on radio resources fixedly allocated to the MS. For example, when receiving, during a $6^{th}$ frame, a NACK signal for a packet transmitted during the $4^{th}$ frame, the BS can retransmit a packet to the MS in response to the NACK signal during a $9^{th}$ frame but not the $8^{th}$ frame (step 325). That is, the BS retransmits the packet to the MS without using the radio resources fixedly allocated to the MS, but using separate radio resources.

The MS receives a retransmission packet by acquiring the retransmission resource allocation information for receiving the retransmission packet through the retransmission resource allocation message received from the BS. Also, the MS can identify original packet information on the retransmission packet through the retransmission resource allocation message.

Figure 4:
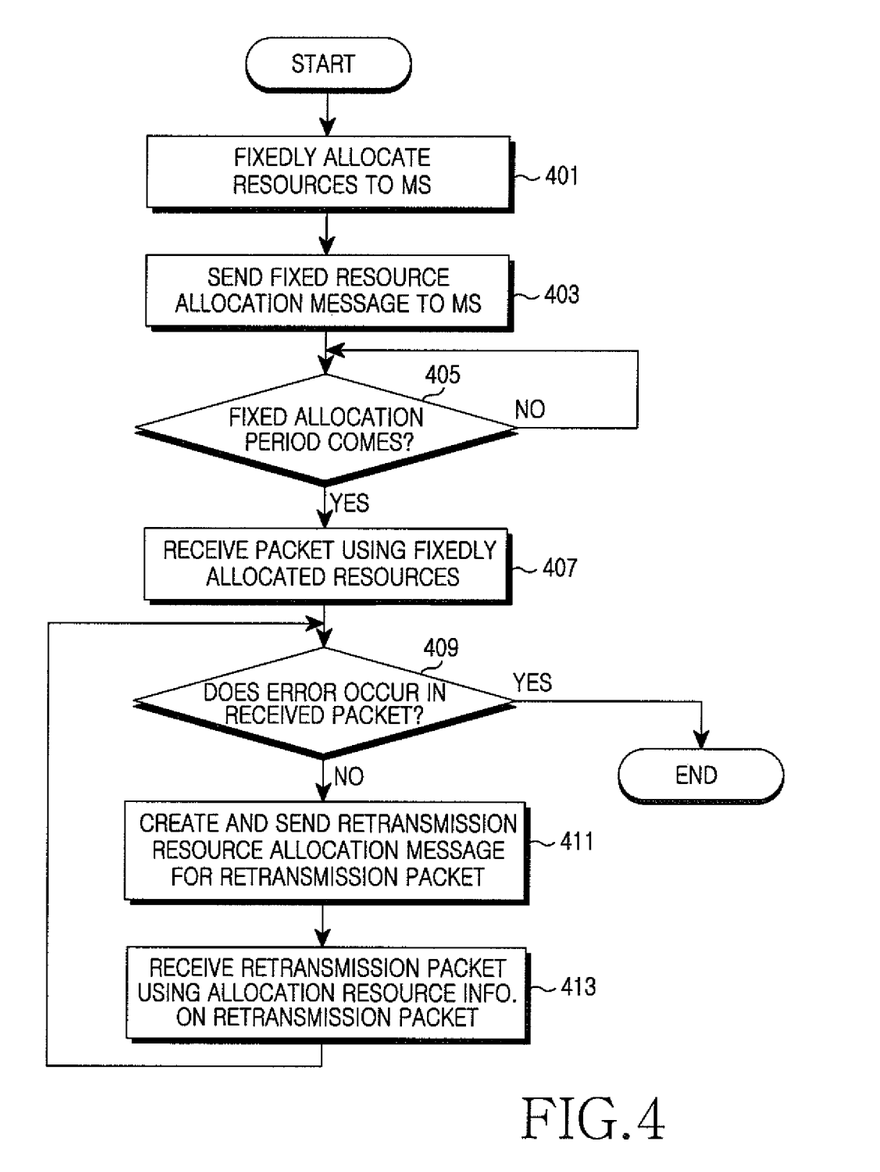
FIG. 4 is a flow diagram illustrating a process of receiving a retransmission UpLink (UL) packet in a BS of a wireless communication system according to an embodiment of the present invention.

FIG. 4 is a flow diagram illustrating a process of receiving a retransmission UpLink (UL) packet in a BS of a wireless communication system according to an embodiment of the present invention. Referring to FIG. 4, in step 401, the BS fixedly allocates radio resources to MSs that use a service that periodically generates traffic among MSs providing a service, e.g., a VoIP.

After allocating the radio resources, the BS transmits fixed resource allocation information to the MSs in step 403. When the BS initially fixedly allocates radio resources to the MS, the BS constructs a fixed resource allocation message as in Table 3 below, for example, and sends the fixed resource allocation message to the MS. Also, when the BS changes the resources fixedly allocated to the MS or releases the fixedly allocated resources, the BS constructs and sends the fixed resource allocation message.

TABLE 3

| Fields | Description |
| --- | --- |
| xx_UL_IE( ){ | |
| Connection ID | Identification of service connection intending for allocation in fixed allocation mode. Generally, Transport Connection ID (TCID) (16 bits) |
| Circuit ID | Identification used only in fixed allocation mode in place of CID. |
| slotOffset | Allocation start slot number of fixed-allocation-mode packet |
| noSlot | Number of allocation slots of fixed-allocation-mode packet |
| Period | Allocation period |
| UIUC, Repetition | Modulation and coding scheme |
| HARQ Enable | 0b0: apply no HARQ<br>0b1: apply HARQ |
| If(HARQ Enable = = 0b1){ | |
| DL ACK Bitmap Index | ACK/NACK bit index within ACK bitmap for UL HARQ packet |
| } | |
| } | |

In Table 3, the fixed resource allocation message includes a Connection IDentification (CID) field representing a proper CID of an MS to receive the fixed resource allocation message, a circuit ID field that is a proper CID of the MS for representing fixed resource allocation in place of the CID field, a slotOffset field including start slot information on a packet when the MS transmits the packet through fixedly allocated resources, a noSlot field representing a size of resources fixedly allocated to transmit the packet, a period field representing a fixed allocation period of the resources, a Uplink Interval Usage Code (UIUC) and repetition field representing a modulation and coding scheme for improvement of a reception ratio for the resource allocation message, a HARQ enable field representing HARQ enabling or disabling, an ACK bitmap index field including information on a channel over which an ACK/NACK signal for a UL packet has been transmitted, etc.

After transmitting the fixed resource allocation information to the MSs, in step 405, the BS identifies if a period of the resources fixedly allocated to the MSs arrives. If the fixed allocation period does not arrive, the BS repeatedly performs step 405.

If the fixed allocation period arrives, the BS receives a packet from the MSs using the resources fixedly allocated to the MS in step 407.

After receiving the packet, in step 409, the BS identifies if there is an error in the packet. For example, the BS determines if there is an error in the packet by identifying a CRC of the packet.

If there is an error in the packet, in step 411, the BS allocates resources for receiving a retransmission packet for the erroneous packet from the MS. Thereafter, the BS creates a resource allocation message for the retransmission packet and sends the resource allocation message to the MS. The retransmission resource allocation message includes original packet information on the erroneous packet.

In another embodiment of the present invention, if there is an error in the packet, the BS transmits an NACK signal for the erroneous packet to the MS. Then, the BS can allocate resources for receiving a retransmission packet and send a retransmission resource allocation message including retransmission resource allocation information to the MS.

After sending the retransmission resource allocation message, in step 413, the BS receives a retransmission packet for the erroneous packet using the resources that are allocated to the MS to receive the retransmission packet.

After receiving the retransmission packet, the BS returns to the step 409, identifying if there is an error in the received retransmission packet.

If there is no error in the packet received from the MS or in the retransmission packet in the step 409, the BS terminates the process of the present invention. Although not specifically shown, the BS transmits an ACK signal for the normal packet to the MS.

Figure 5:
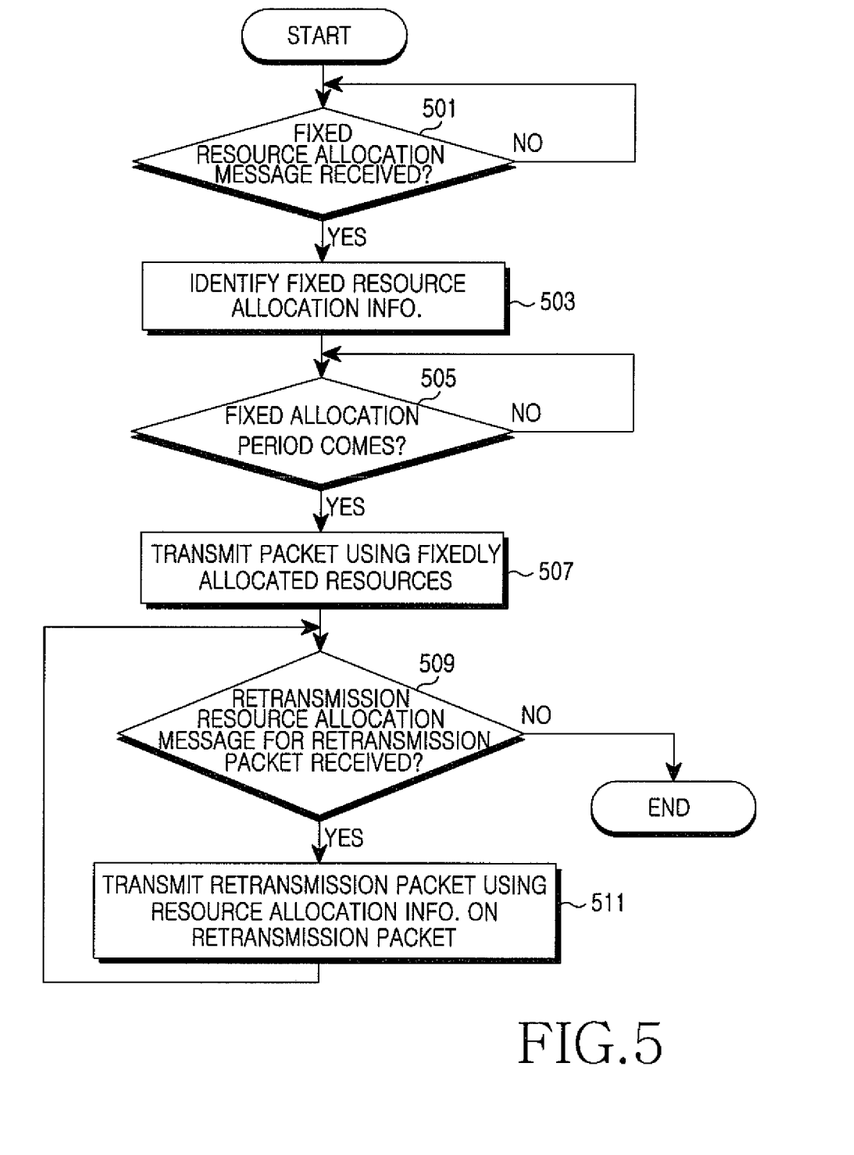
FIG. 5 is a flow diagram illustrating a process of retransmitting a UL packet in an MS of a wireless communication system according to an embodiment of the present invention.

FIG. 5 is a flow diagram illustrating a process of retransmitting a UL packet in an MS of a wireless communication system according to an embodiment of the present invention. Referring to FIG. 5, the MS identifies if it receives a fixed resource allocation message from a BS in step 501. If the fixed resource allocation message is not received, the MS repeatedly performs step 501.

If the fixed resource allocation message is received, the MS identifies information on radio resources, which are fixedly allocated by the BS, in the fixed resource allocation message in step 503. The fixed resource allocation message is constructed as in Table 3 above, for example, and includes fixed resource allocation information such as a position of the resources fixedly allocated by the BS, a size of the fixedly allocated resources, and a fixed allocation period.

The MS communicates using the fixedly allocated radio resources until receiving a radio resource change message or a radio resource release message from the BS.

In step 505, the MS identifies if the fixed allocation period arrives. If the fixed allocation period does not arrive, the MS repeatedly performs step 505.

If the fixed allocation period arrives, in step 507, the MS transmits a packet to the BS using the fixedly allocated resources.

In step 509, the MS identifies if it receives a retransmission resource allocation message from the BS.

If the retransmission resource allocation message is received, in step 511, the MS identifies information on an erroneous packet and retransmission resource allocation information for retransmitting an original packet for the erroneous packet, in the retransmission resource allocation message. Then, the MS transmits the original packet for the erroneous packet to the BS depending on the retransmission resource allocation information for retransmitting the original packet for the erroneous packet.

After retransmitting the original packet, the MS returns to step 509, identifying if it receives a retransmission resource allocation message from the BS.

If the retransmission resource allocation message is not received for a predetermined time in step 509, the MS determines that there is no error in the packet transmitted to the BS or the retransmission packet and then, terminates the process.

In the above-described embodiment of the present invention, the MS determines if it receives a retransmission resource allocation message, thereby identifying if there is an error in a packet transmitted to the BS. In another embodiment of the present invention, the MS can identify if there is an error in a packet transmitted to the BS depending on an ACK signal or an NACK signal received from the BS. Thus, if the ACK signal is received, the MS recognizes that the packet is normally transmitted to the BS and then, terminates the process. If the NACK signal is received or the ACK/NACK signal is not received for a predetermined time, however, the MS recognizes that there occurs an error in the packet transmitted to the BS and identifies if it receives a retransmission resource allocation message.

As described above, when the MS is fixedly allocated radio resources, the MS transmits an original packet to the BS using the initially fixedly allocated radio resources. Accordingly, the BS does not have to periodically send a resource allocation message to the MS.

However, during packet retransmission, the BS creates and sends a retransmission resource allocation message to the MS so that the MS can retransmit a packet without using the fixedly allocated radio resources, but using separate radio resources.

Figure 6:
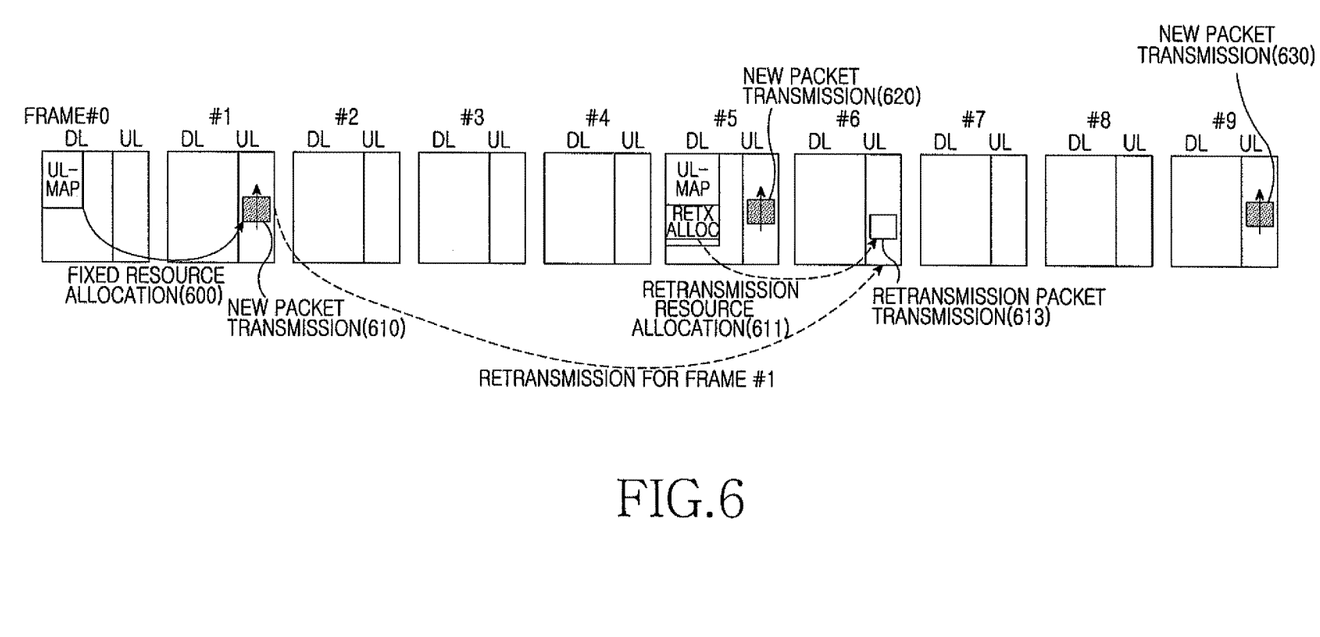
FIG. 6 is a diagram illustrating a frame for receiving a retransmission UL packet in a wireless communication system according to an embodiment of the present invention.

FIG. 6 is a diagram illustrating a frame for receiving a retransmission UL packet in a wireless communication system according to an embodiment of the present invention. As illustrated in FIG. 6, when a BS fixedly allocates radio resources having, for example, a period of four frames, it transmits fixed resource allocation information to an MS during a $0^{th}$ frame (step 600). The MS transmits new packets to the BS during a $1^{st}$ frame, a $5^{th}$ frame, and a $9^{th}$ frame using the radio resources fixedly allocated by the BS during the $0^{th}$ frame (steps 610, 620, and 630).

As described above, the MS transmits a packet to the BS using resources fixedly allocated by the BS. Thus, the BS does not send a resource allocation message for a UL packet, except when fixedly allocating radio resources to the MS such as during the $0^{th}$ frame.

The BS determines if there is an error in the packet received from the MS during the $1^{ST}$ frame, the $5^{th}$ frame, and the $9^{th}$ frame and notifies the MS as to if there is an error in the packet. For example, if there is an error in the packet received during the $1^{st}$ frame, the BS allocates resources for receiving a retransmission packet from the MS. The BS sends, to the MS, a retransmission resource allocation message including retransmission resource allocation information for retransmission (step 611).

In another embodiment of the present invention, the BS transmits, to the MS, an ACK/NACK signal representing if there is an error in a packet received from the MS. That is, the BS transmits an ACK signal to the MS if there is no error in the packet. If there is an error in the packet, the BS transmits an NACK signal to the MS. Then, the BS allocates resources for receiving a retransmission packet for the erroneous packet from the MS and sends a retransmission resource allocation message including the retransmission resource allocation information to the MS (step 611).

If the retransmission resource allocation message is received from the BS, the MS transmits a retransmission packet to the BS through the retransmission resource allocation information included in the retransmission resource allocation message (step 613). The MS can acquire original packet information on the retransmission packet from the retransmission resource allocation message.

In the above-described embodiment, when fixedly allocating resources, the wireless communication system allocates a circuit ID to each MS to reduce a size of a resource allocation message. In another embodiment, the wireless communication system can also use a CID without allocating a separate circuit ID.

Figure 7:
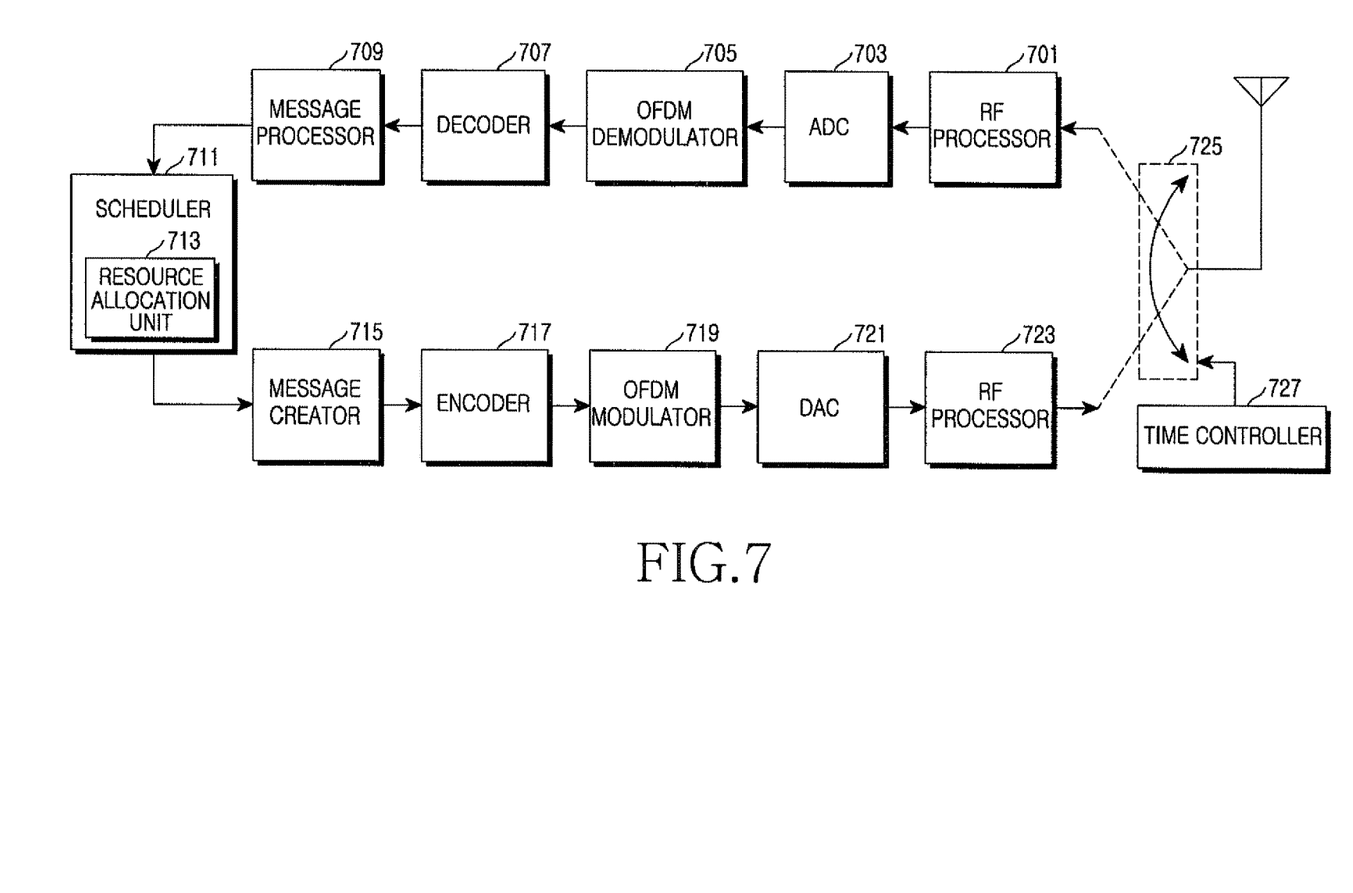
FIG. 7 is a block diagram illustrating a BS in a wireless communication system according to an embodiment of the present invention.

FIG. 7 is a block diagram illustrating a BS in a wireless communication system according to an embodiment of the present invention. As illustrated in FIG. 7, the BS includes a Radio Frequency (RF) processor 701, an Analog/Digital Converter (ADC) 703, an Orthogonal Frequency Division Multiplexing (OFDM) demodulator 705, a decoder 707, a message processor 709, a scheduler 711, a resource allocation unit 713, a message creator 715, an encoder 717, an OFDM modulator 719, a Digital/Analog Converter (DAC) 721, an RF processor 723, a switch 725, and a time controller 727. The time controller 727 controls a switching operation of the switch 725 using frame synchronization. For example, during a signal reception, the time controller 727 controls the switch 725 to connect an antenna with the RF processor 701 of a receive end. Also, during a signal transmission, the time controller 727 controls the switch 725 to connect the antenna with the RF processor 723 of a transmit end.

During the signal reception, the RF processor 701 converts an RF signal received through the antenna into a baseband analog signal. The ADC 703 converts an analog signal provided from the RF processor 701 into a digital signal. The OFDM demodulator 705 processes, by Fast Fourier Transform (FFT), for example, a time-domain signal provided from the ADC 703, and converts the time-domain signal into a frequency-domain signal.

The decoder 707 selects data of subcarriers intended for actual reception among frequency-domain data provided from the OFDM demodulator 705. Then, the decoder 707 demodulates and decodes the selected data according to a predefined modulation level, i.e., a Modulation and Coding Scheme (MCS) level.

The message processor 709 analyzes a control message provided from the decoder 707 and provides the analysis result to the scheduler 711. For example, the message processor 709 identifies channel state information received from MSs and provides the channel state information to the scheduler 711.

The scheduler 711 performs scheduling for each MS depending on the channel state information of the MSs provided from the message processor 709 and the kind of a service used by the MSs. More specifically, the scheduler 711 allocates radio resources for providing a service to the MSs, using the resource allocation unit 713. For example, when an MS to be allocated resources uses a service periodically generating traffic, the resource allocation unit 713 fixedly allocates radio resources for allowing the MS to transmit/receive an original packet. That is, the resource allocation unit 713 initially fixedly allocates resources for allowing an MS to transmit/receive an original packet. Then, the resource allocation unit 713 does not allocate separate radio resources to the MS unless there is a change of the radio resources allocated to the MS or a release of the allocated resources.

However, when the MS transmits/receives a retransmission packet, the resource allocation unit 713 allocates resources for allowing the MS to transmit/receive the retransmission packet. Whenever the MS transmits/receives the retransmission packet, the resource allocation unit 713 allocates the radio resources. For example, if there is an error in a packet transmitted to an MS, the resource allocation unit 713 allocates resources for retransmitting a packet for the erroneous packet considering channel state information of the MSs. Also, if there is an error in a packet received from an MS, the resource allocation unit 713 allocates resources for receiving a retransmission packet for the erroneous packet from the MS.

The message creator 715 creates a resource allocation message for transmitting resource allocation information, which is provided from the scheduler 711, to each MS. For example, if the resource allocation unit 713 of the scheduler 711 fixedly allocates radio resources to an MS, the message creator 715 creates a fixed resource allocation message constructed as in Table 1 or 3, for example. If the resource allocation unit 713 of the scheduler 711 allocates radio resources for retransmitting a packet, the message creator 715 creates a retransmission resource allocation message constructed as in Table 2, for example.

The encoder 717 encodes and modulates a signal provided from the message creator 715 according to a predefined modulation level, i.e., an MCS level.

The OFDM modulator 719 processes, by Inverse Fast Fourier Transform (IFFT), a frequency-domain signal provided from the encoder 717 and converts the frequency-domain signal into a time-domain sample signal. The DAC 721 converts a sample signal provided from the OFDM modulator 719 into an analog signal. The RF processor 723 converts a baseband signal provided from the DAC 721 into an RF signal and transmits the RF signal through the antenna.

Figure 8:
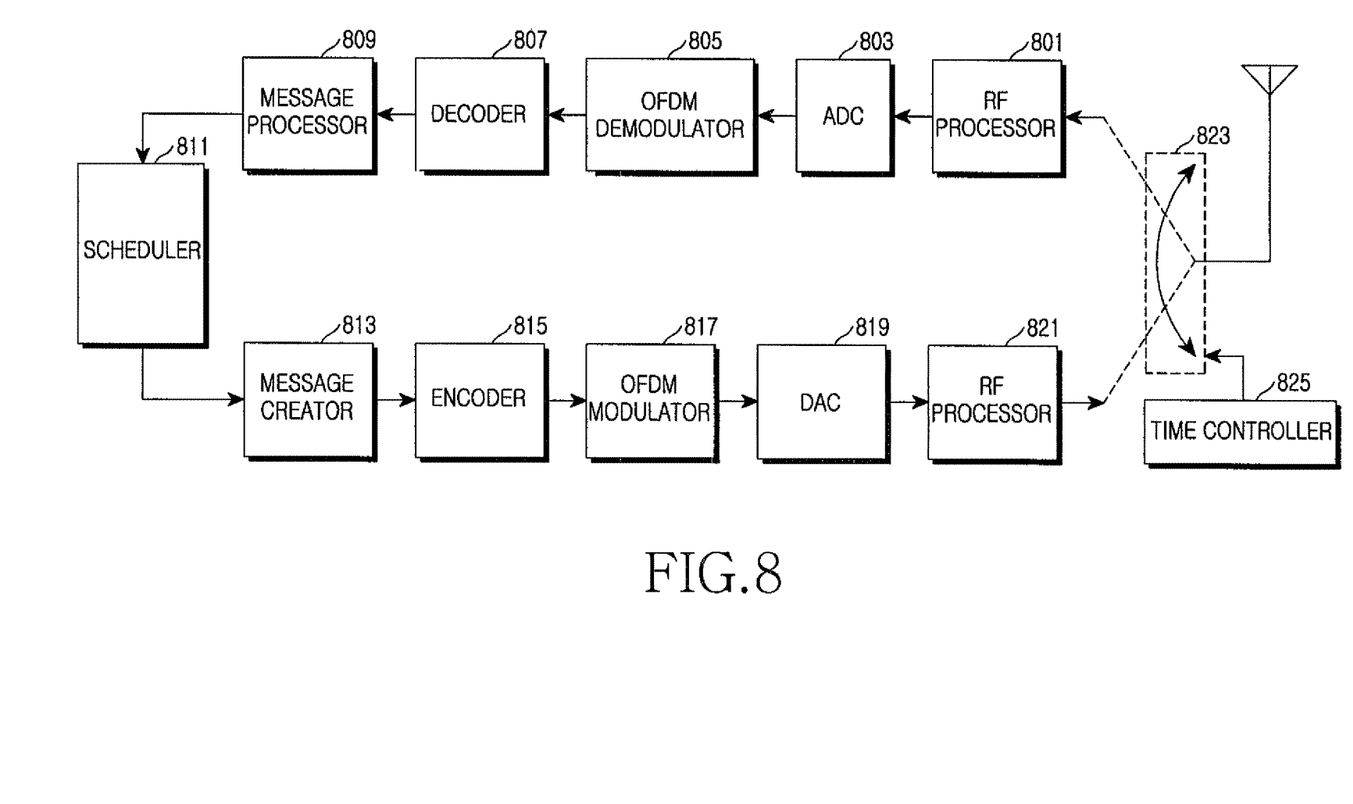
FIG. 8 is a block diagram illustrating an MS in a wireless communication system according to an embodiment of the present invention.

FIG. 8 is a block diagram illustrating an MS in a wireless communication system according to an embodiment of the present invention. As illustrated in FIG. 8, the MS includes an RF processor 801, an ADC 803, an OFDM demodulator 805, a decoder 807, a message processor 809, a scheduler 811, a message creator 813, an encoder 815, an OFDM modulator 817, a DAC 819, an RF processor 821, a switch 823, and a time controller 825. The time controller 825 controls a switching operation of the switch 823 according to frame synchronization. For example, during a signal reception, the time controller 825 controls the switch 823 to connect an antenna with the RF processor 801 of a receive end, and during a signal transmission, the time controller 825 controls the switch 823 to connect the antenna with the RF processor 821 of a transmit end.

During the signal reception, the RF processor 801 converts an RF signal received through the antenna into a baseband analog signal. The ADC 803 converts an analog signal provided from the RF processor 801 into a digital signal. The OFDM demodulator 805 processes, by Fast Fourier Transform (FFT), for example, a time-domain signal provided from the ADC 803 and converts the time-domain signal into a frequency-domain signal.

The decoder 807 selects data of subcarriers intended for actual reception among frequency-domain data provided from the OFDM demodulator 805. Then, the decoder 807 demodulates and decodes the selected data according to a predefined modulation level, i.e., an MCS level.

The message processor 809 analyzes a control message provided from the decoder 807 and provides the result to the scheduler 811. For example, the message processor 809 detects resource allocation information from a resource allocation message provided from a BS and provides the resource allocation information to the scheduler 811. When the message processor 809 is fixedly allocated resources by the BS, the message processor 809 detects a start position of the fixedly allocated resources, a size of the fixedly allocated resources, an allocation period, and circuit ID information from a fixed resource allocation message, and provides the detection result to the scheduler 811. Also, the message processor 809 detects a start position of resources for retransmitting a packet, a size of the resources, and original packet information from a retransmission resource allocation message and provides the detection result to the scheduler 811.

The scheduler 811 performs scheduling for transmitting/receiving an original packet or a retransmission packet through resource allocation information provided from the message processor 809. The message creator 813 creates an ACK/NACK message for a packet received depending on scheduling information provided from the scheduler 811. The encoder 815 encodes and modulates a message or packet provided from the message creator 813 according to a predefined modulation level, i.e., an MCS level.

The OFDM modulator 817 processes, by IFFT, a frequency-domain signal provided from the encoder 815 and converts the frequency-domain signal into a time-domain sample signal. The DAC 819 converts a sample signal provided from the OFDM modulator 817 into an analog signal. The RF processor 821 converts a baseband signal provided from the DAC 819 into an RF signal and transmits the RF signal through the antenna.

As described above, embodiments of the present invention have an advantage of, if radio resources are fixedly allocated in a wireless communication system, allocating resources for a retransmission packet separately from the fixedly allocated resources. Original packet information on the retransmission packet can be clearly recognized, thereby reducing a retransmission error and increasing resource use efficiency. Also, there is an advantage of reducing a quantity of control information caused by resource allocation and retransmission, by allocating a CID of a smaller size than a general CID to each MS.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method of a base station (BS) in a wireless communication system, the method comprising:
   transmitting, to a mobile terminal, a first resource allocation message for fixedly allocating a plurality of resources that are distributed over a plurality of frames for a connection with the mobile terminal;
   transmitting, to the mobile terminal, a first packet using a first resource among the plurality of resources;
   if information indicating a negative acknowledgement (NACK) for the first packet is received, transmitting, to the mobile terminal, a second resource allocation message comprising information on a resource allocated for retransmitting the first packet; and
   retransmitting, to the mobile terminal, the first packet using the resource allocated by the second resource allocation message,
   wherein the first resource allocation message comprises a first identification and a second identification,
   wherein the second resource allocation message comprises the second identification without the first identification,
   wherein the first identification in the first resource allocation message is used to identify the connection related to the first packet,
   wherein the second identification in the second resource allocation message is used to identify a connection related to the retransmission of the first packet,
   wherein the second identification has a smaller size than the first identification,
   wherein the first identification comprises an identification for identifying a service connection to the mobile terminal and the second identification comprises another identification for identifying a fixed allocation of resources for retransmission to the mobile terminal, and
   wherein the first identification is different than the second identification.

2. The method of claim 1, wherein the first resource allocation message comprises at least one of a start position of the plurality of resources, a size of each of the plurality of resources, an allocation period of the plurality of resources, a modulation and coding scheme, retransmission enabling or disabling, and a time point of transmission of a control message including information indicating whether an error occurs.

3. The method of claim 1, wherein the resource allocated by the second resource allocation message is separate from the plurality of resources allocated by the first resource allocation message.

4. The method of claim 1, wherein the information on the resource allocated for retransmitting the first packet indicates at least one of a position and a size of the resource allocated for retransmitting the first packet.

5. The method of claim 1, wherein the second identification alone is used to identify the connection to the terminal without the first identification when the first packet is retransmitted.

6. The method of claim 1, wherein a size of the second identification depends on a number of terminals for which fixed allocations is allowable by the base station.

7. A method of a mobile terminal in a wireless communication system, the method comprising:
   receiving, from a base station (BS), a first resource allocation message for fixedly allocating a plurality of resources that are distributed over a plurality of frames for a connection with the mobile terminal;
   receiving, from the BS, a first packet using a first resource allocated by the first resource allocation message;
   if an error occurs in the first packet, transmitting, to the BS, information indicating a negative acknowledgement (NACK) for the first packet;

receiving, from the BS, a second resource allocation message comprising information on a resource allocated for retransmitting the first packet;

receiving, from the B S, the retransmitted first packet using the resource allocated by the second resource allocation message, wherein the first resource allocation message comprises a first identification and a second identification, wherein the second resource allocation message comprises the second identification without the first identification, wherein the first identification in the first resource allocation message is used to identify the connection related to the first packet, wherein the second identification in the second resource allocation message is used to identify a connection related to the retransmission of the first packet, wherein the second identification has a smaller size than the first identification, wherein the first identification comprises an identification for identifying a service connection to the mobile terminal and the second identification comprises another identification for identifying a fixed allocation of resources for retransmission to the mobile terminal, and wherein the first identification is different than the second identification.

8. The method of claim 7, wherein the first resource allocation message comprises at least one of a start position of the plurality of resources, a size of each of the plurality of resources, an allocation period of the plurality of resources, a modulation and coding scheme, retransmission enabling or disabling, and a time point of transmission of a control message including information indicating whether an error occurs.

9. The method of claim 7, wherein the resource allocated by the second resource allocation message is separate from the plurality of resources allocated by the first resource allocation message.

10. The method of claim 7, wherein the information on the resource allocated for retransmitting the first packet indicates at least one of a position and a size of the resource allocated for retransmitting the first packet.

11. The method of claim 7, wherein the second identification alone is used to identify the connection to the terminal without the first identification when the first packet is retransmitted.

12. The method of claim 7, wherein a size of the second identification depends on a number of terminals for which fixed allocations is allowable by the base station.

13. A mobile terminal of a wireless communication system, the mobile terminal comprising:

a transceiver configured to:

receive a first resource allocation message for fixedly allocating a plurality of resources that are distributed over a plurality of frames for a connection, receive a first packet using a first resource allocated by the first resource allocation message, if an error occurs in the first packet, transmit information indicating negative acknowledgement (NACK) for the first packet, receive a second resource allocation message comprising information on a resource allocated for retransmitting the first packet, and receive the retransmitted first packet using the resource allocated by the second resource allocation message, wherein the first resource allocation message comprises a first identification and a second identification, wherein the second resource allocation message comprises the second identification without the first identification, wherein the first identification in the first resource allocation message is used to identify the connection related to the first packet, wherein the second identification in the second resource allocation message is used to identify a connection related to the retransmission of the first packet, wherein the second identification has a smaller size than the first identification, wherein the first identification comprises an identification for identifying a service connection to the mobile terminal and the second identification comprises another identification for identifying a fixed allocation of resources for retransmission to the mobile terminal, and wherein the first identification is different than the second identification.

14. The mobile terminal of claim 13, wherein the first resource allocation message comprises at least one of a start position of the plurality of resources, a size of each of the plurality of resources, an allocation period of the plurality of resources, a modulation and coding scheme, retransmission enabling or disabling, and a time point of transmission of a control message including information indicating whether an error occurs.

15. The mobile terminal of claim 13, wherein the resource allocated by the second resource allocation message is separate from the plurality of resources allocated by the first resource allocation message.

16. The mobile terminal of claim 13, wherein the information on the resource allocated for retransmitting the first packet indicates at least one of a position and a size of the resource allocated for retransmitting the first packet.

17. The mobile terminal of claim 13, wherein the second identification alone is used to identify the connection to the terminal without the first identification when the first packet is retransmitted.

18. The mobile terminal of claim 13, wherein a size of the second identification depends on a number of terminals for which fixed allocations is allowable by the base station.

* * * * *